US007015163B2

(12) United States Patent
Sato et al.

(10) Patent No.: US 7,015,163 B2
(45) Date of Patent: Mar. 21, 2006

(54) GLASS MEMBER RESISTANT TO PLASMA CORROSION

(75) Inventors: Tatsuhiro Sato, Koriyama (JP); Kazuo Koya, Koriyama (JP)

(73) Assignees: Heraeus Quarzglas GmbH & Co. KG, Hanau (DE); Shin-Etsu Quartz Products Co., Ltd., Tokyo (JP)

( * ) Notice: Subject to any disclaimer, the term of this patent is extended or adjusted under 35 U.S.C. 154(b) by 215 days.

(21) Appl. No.: 10/399,097

(22) PCT Filed: Oct. 11, 2001

(86) PCT No.: PCT/EP01/11771

§ 371 (c)(1),
(2), (4) Date: Apr. 14, 2003

(87) PCT Pub. No.: WO02/30840

PCT Pub. Date: Apr. 18, 2002

(65) Prior Publication Data

US 2003/0185738 A1 Oct. 2, 2003

(30) Foreign Application Priority Data

Oct. 13, 2000 (JP) ............................ 2000-314167

(51) Int. Cl.
*C03C 3/078* (2006.01)
*C03C 3/085* (2006.01)

(52) U.S. Cl. .......................................... 501/72; 501/69

(58) Field of Classification Search .................. 501/72, 501/70

See application file for complete search history.

(56) References Cited

U.S. PATENT DOCUMENTS

| | | | | |
|---|---|---|---|---|
| 4,012,263 | A * | 3/1977 | Shell | 501/70 |
| 4,888,314 | A * | 12/1989 | Bernier et al. | 501/119 |
| 6,087,284 | A | 7/2000 | Brix et al. | |
| 6,605,554 | B1 * | 8/2003 | Bitossi et al. | 501/10 |
| 2003/0176269 | A1 * | 9/2003 | Arai et al. | 501/54 |

FOREIGN PATENT DOCUMENTS

| | | | |
|---|---|---|---|
| EP | 0 763 504 | A | 3/1997 |
| EP | 0 940 845 | A | 9/1999 |
| JP | 11 228172 | A | 8/1999 |
| SU | 579241 | * | 11/1977 |
| WO | 02/094727 | * | 4/2002 |

OTHER PUBLICATIONS

Patent Abstracts of Japan, vol. 1999, No. 13, Nov. 30, 1999, for JP 11 228172.
Kirk Othmer, "Encyclopedia of Chemical Technology" Third Edition, vol. 11, 1989.

* cited by examiner

*Primary Examiner*—Karl Group
(74) *Attorney, Agent, or Firm*—Tiajoloff & Kelly

(57) ABSTRACT

It is an object of the present invention to provide a glass member resistant against plasma corrosion suitably used as a jig material in producing semiconductors, which exhibits excellent resistance against plasma corrosion, and which is free from the generation of particles. The above problem is solved by a glass member resistant to plasma corrosion, comprising a portion to be exposed to plasma gas, which is made of a glass material containing, as the essential component, one compound component selected from the group consisting of compounds expressed by one of the chemical formulae $SiO_2$—$Al_2O_3$—CaO, $SiO_2$—$Al_2O_3$—MgO, $SiO_2$—BaO—CaO, $SiO_2$—$ZrO_2$—CaO, $SiO_2$—$TiO_2$—BaO, provided that the constitution ratio of the compound components is within the vitrification range.

2 Claims, 3 Drawing Sheets

[Fig. 1]
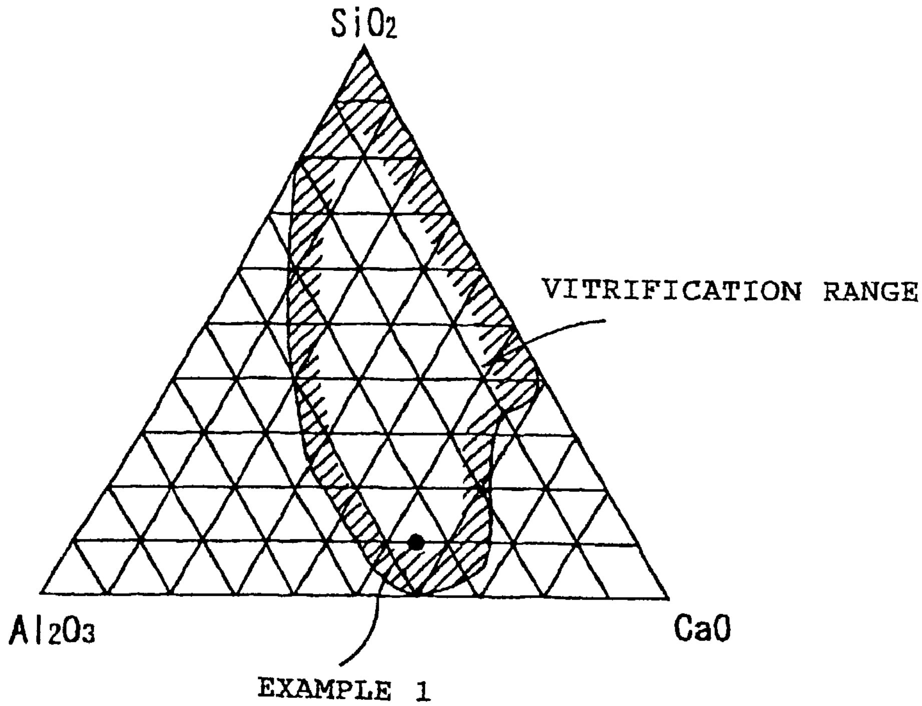
[Fig. 2]
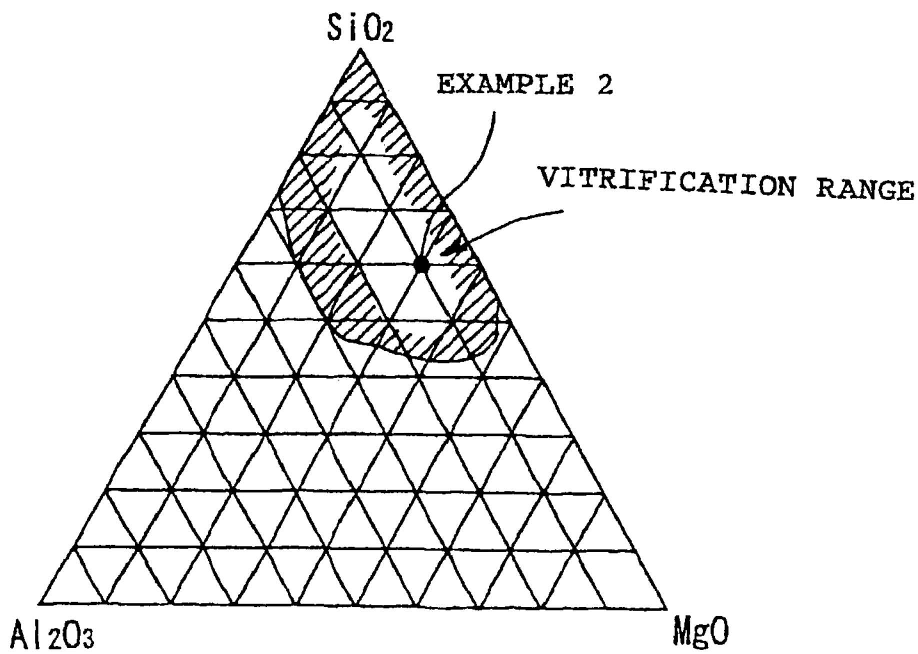

[Fig. 3]
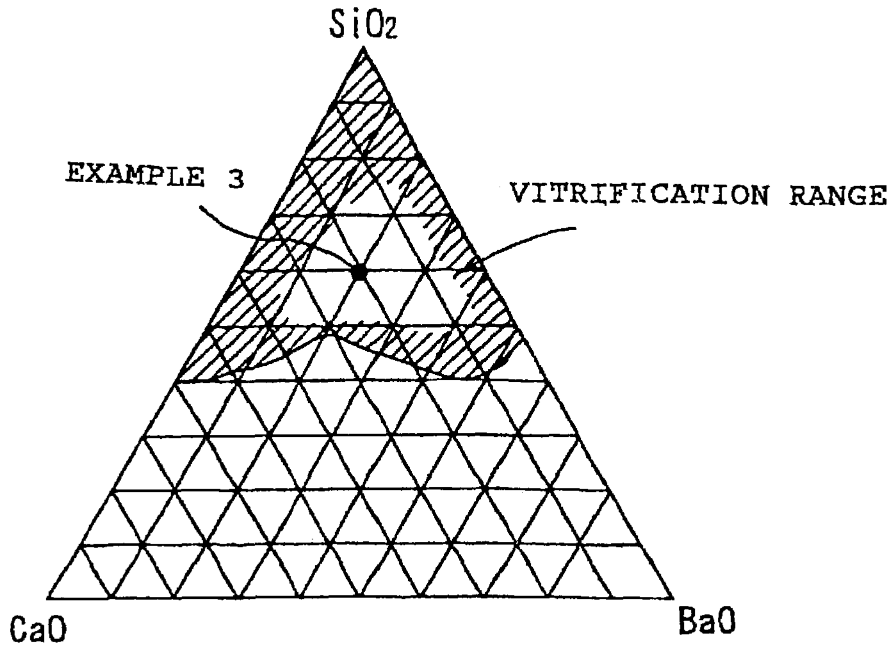
[Fig. 4]
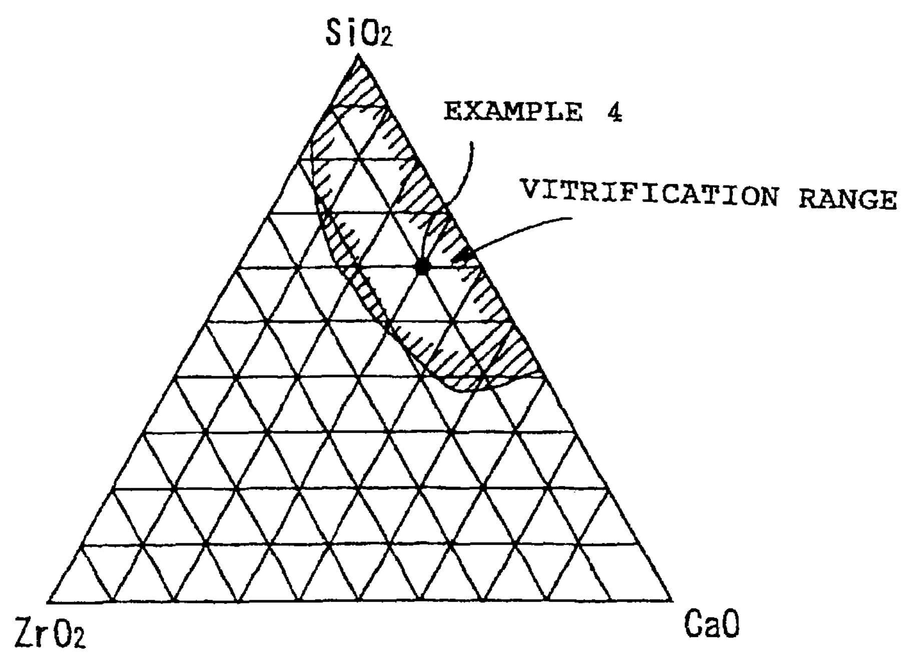

[Fig. 5]
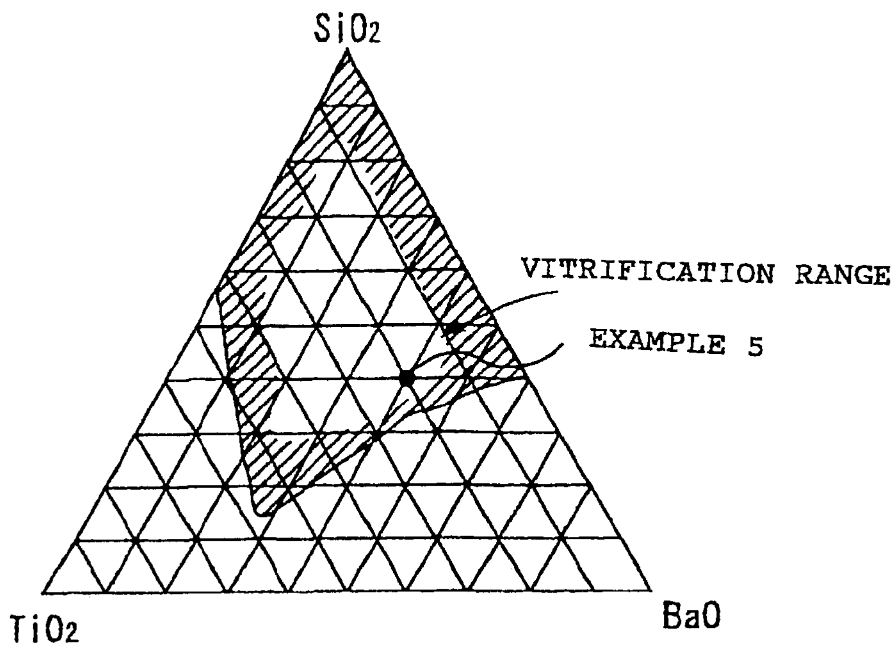
[Fig. 6]
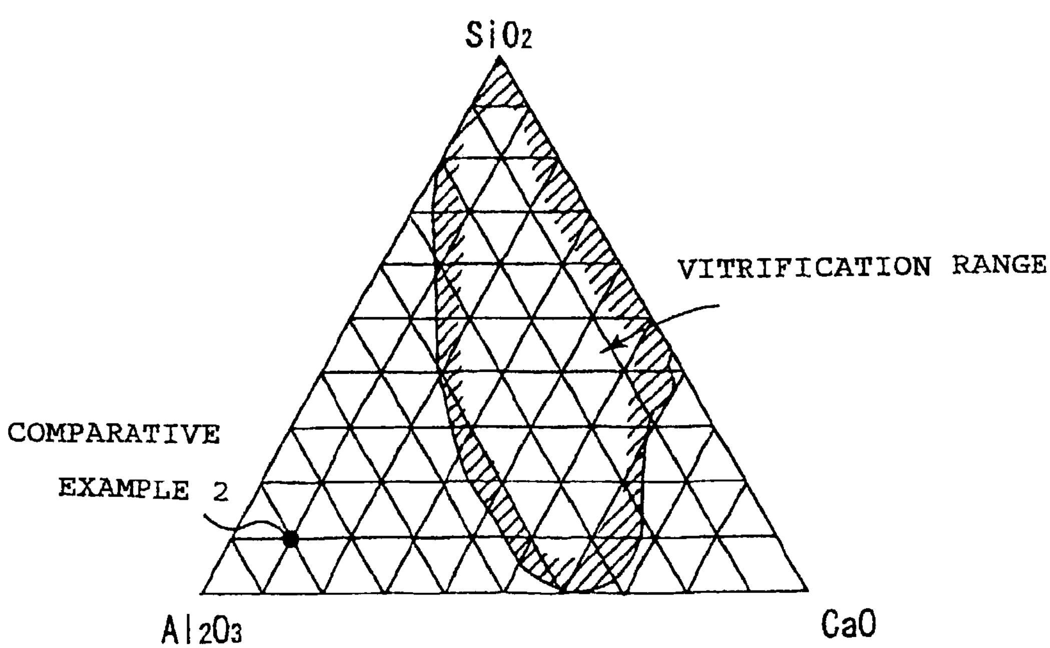

GLASS MEMBER RESISTANT TO PLASMA CORROSION

TECHNOLOGICAL FIELD OF THE INVENTION

The present invention relates to a glass member resistant to plasma corrosion suitable for a jig for use in the production of semiconductors.

RELATED ART

Recently, F-based gas is frequently applied as a plasma-etching gas for use in the semiconductor production process. In case quartz glass is used as the member, SiF may generate on the surface of the member. Since the boiling point of SiF is −86° C., it easily volatilizes as to cause etching on the surface of the quartz member, and this limits the life of the member.

As a means to overcome the problem above, in JP-A-Hei10-45461 is proposed a member containing a compound of a Group 2a or a Group 3a element of the periodic table to use as a member resistant to corrosion against halogen-based plasma; in further detail, there is disclosed an $AB_2O_4$ type compound containing the elements above together with Al and the like.

Most of the metallic elements above generate a fluoride through their reaction with the F-based gas, and the boiling points of those fluorides are higher than that of SiF. Accordingly, the etching rate of such compounds decreases as compared with that of the quartz glass member, and the usable life thereof can be considerably elongated.

However, among the metallic elements above, many types cause problems when used in the production process of semiconductors. Moreover, in case the corrosion proceeds at the grain boundaries during heating, peeling occurs as to generate particles, and, from the holes of the grain boundaries at which the corrosion has proceeded, discharge gas evolves at a large quantity. If these particles and discharged gases adhere or remain on the wafer, it results in a greatly increased defect ratio in the production of semiconductor devices.

Problems the Invention is to Solve

The present invention has been accomplished in the light of the aforementioned problems, and an object of the present invention is to provide a glass member resistant to plasma corrosion suitable for use as a jig material in producing semiconductors, which has excellent corrosion resistance against plasma and yet capable of minimizing the generation of particles.

Means for Solving the Problems

In order to overcome the problems above, the glass member resistant to plasma corrosion according to the present invention is characterized by comprising a glass material containing one compound component selected from the group consisting of compounds expressed by the chemical formulae (1) to (5) below as the essential component, provided that the constitution ratio of the compound components is within the vitrification range.

$SiO_2$—$Al_2O_3$—CaO Chemical (1):

$SiO_2$—$Al_2O_3$—MgO Chemical (2):

$SiO_2$—BaO—CaO Chemical (3):

$SiO_2$—$ZrO_2$—CaO Chemical (4):

$SiO_2$—$TiO_2$—BaO Chemical (5):

The glass member resistant to plasma corrosion according to the present invention has been implemented based on the findings that forming a composite material containing a large amount of a metallic element whose fluoride yields a high boiling point can reduce the etching rate due to the reaction with a F-based plasma gas. In case of using the glass member resistant to plasma corrosion according to the present invention, it is preferred to use the metallic element which causes less problems in producing semiconductor devices; for instance, Al is best preferred, but also applicable are Ca, Ba, Zr, Ti, etc., because they can suppress the etched amount and the number of the generated particles.

However, in case of forming a composite member by mixing and firing the metallic elements above in the form of oxides, the constitution ratio of the components must be adjusted within a certain range. Otherwise, the metal oxide components would not mix uniformly with one another, and each of the metal oxides would solidify by themselves as to form boundaries. Thus, plasma corrosion proceeds from the boundaries as to generate particles due to peeling off, and results in gas evolution.

In order to solve the problems above, the mixing ratio of the metal oxides is adjusted to make a glass and suppress the formation of boundaries. For instance, the problems above can be prevented from occurring by mixing and firing $Al_2O_3$, CaO, and BaO at a ratio of 28 wt. %, 36 wt. %, and 36 wt. %, respectively.

Furthermore, by mixing $SiO_2$ in addition to the components above, a stable composite material having a wide range of vitrification can be obtained. In general, these compounds include $SiO_2$—$Al_2O_3$—CaO or $SiO_2$—$Al_2O_3$—MgO, i.e., those generally defined as aluminosilicate glass, and those obtained by substituting the $Al_2O_3$ component thereof by $ZrO_2$ or $TiO_2$; however, the constitution ratio (as expressed by mol %) of the components should fall in the range capable of forming a glass as shown in the ternary diagram (see FIGS. 1 to 6). In this case, components other than the three components above are sometimes incorporated up to several percents by molar, but preferably, the content thereof is suppressed to 1 mol % or lower.

EXAMPLES

The present invention is described in further detail below by means of specific examples. However, it should be understood that the embodiments below are provided as mere examples and that they are by no means limiting the present invention.

Examples 1 to 5 and Comparative Examples 1 and 2

The compound components shown in Table 1 are each mixed in accordance with the constitution ratio, and the resulting mixture was placed inside a heating furnace to heat and melt at 1750° C. under vacuum to thereby obtain a glass body 100 mm in diameter and 50 mm in thickness. Each constitution ratio gives one point in each triangular diagramm of FIGS. 1 to 6 below. However, it is expected that mixtures with a deviation of about ±10% to 30% from the exact constitution ratio given in the examples will show the same properties concerning suitability for use in the production of semiconductors as long as the mixture falls in the range capable of forming a glass. In Comparative Example 2, however, no vitrification occurred, and it resulted in a non-glassy body in which numerous grain boundaries were observed. The glass bodies or the non-glassy body thus obtained were subjected to the measurement of the transmittance of visible radiation, plasma test (to obtain the etching rate), and the measurement of the number of generated particles. The results are given in Table 1.

The transmittance of visible radiation for the glass bodies obtained in Examples 1 to 5 fell in a range of from 80 to 88%, which was well comparable to 90%, i.e., the value obtained in Comparative Example 1 (a transparent quartz glass consisting of 100% $SiO_2$). Hence, the glass bodies obtained in Examples 1 to 5 can be each regarded as a transparent glass body.

In the plasma test, the etching rate of the glass bodies obtained in Examples 1 to 5 fell in a range of from 2 to 8 (nm/min), and was about the same as that obtained in Comparative Example 2; it was found that the etching rates were each reduced to about one-tenth of that obtained in Comparative Example 1 (quartz glass), and that the plasma corrosion resistance of the samples was considerably improved.

The number of particles generated on the glass bodies obtained in Examples 1 to 5 was in a range of from 10 to 27, i.e., about the same as that of the quartz glass in Comparative Example 1; however, it was found that the number of the generated particles was reduced to about 6.6 to 2.4% of that obtained in Comparative Example 2.

TABLE 1

| | Production method | Constitution ratio of components (mol %) | | Transmittance (%) | Etching rate (nm/min) | Particles generated (particles) |
|---|---|---|---|---|---|---|
| Ex. 1 | Heating in vacuum | $Al_2O_3$<br>CaO<br>$SiO_2$ | 35%<br>55%<br>10% | 82 | 5 | 10 |
| Ex. 2 | Heating in vacuum | $Al_2O_3$<br>MgO<br>$SiO_2$ | 10%<br>30%<br>60% | 85 | 3 | 27 |
| Ex. 3 | Heating in vacuum | BaO<br>CaO<br>SiO2 | 20%<br>20%<br>60% | 80 | 2 | 17 |
| Ex. 4 | Heating in vacuum | $ZrO_2$<br>CaO<br>$SiO_2$ | 10%<br>30%<br>60% | 84 | 8 | 11 |
| Ex. 5 | Heating in vacuum | $TiO_2$<br>BaO<br>$SiO_2$ | 20%<br>40%<br>40% | 88 | 6 | 27 |
| Comp. Ex. 1 | Heating in vacuum | $SiO_2$ | 100% | 90 | 100 | 23 |
| Comp. Ex. 2 | Heating in vacuum | $Al_2O_3$<br>CaO<br>$SiO_2$ | 80%<br>10%<br>10% | 10 | 5 | 409 |

The performance tests on the glass bodies or the non-glassy body above were carried out in accordance with the methods below.

(1) Transmittance of visible radiation: A sample 2 mm in thickness was each cut out from the glass bodies or the non-glassy body above, and a visible radiation 1 $\mu$m in wavelength was irradiated thereto to measure the transmittance thereof.

(2) Plasma test (etching rate): A sample piece was each cut out from the glass bodies or the non-glassy body above, and the thus obtained samples were each machined to a test piece 30 mm in diameter and 3 mm in thickness, fire-polished on the surface, and were subjected to an etching test to obtain the etching rate by applying 1 kW (Kilowatt) under a vacuum degree of 30 mTorr for a duration of 10 hours while flowing $CF_4$ gaseous plasma containing mixed therein $O_2$ (20%) at a rate of 50 sccm ("sccm" means "standard cubic centimeter"; it should be understand that the flow rate is 50 $cm^3$ per minute).

(3) Number of generated particles: After etching the test pieces in the plasma test above, Si wafers having the same area as that of the plasma-irradiated surface of the test pieces were each mounted on the surface of each of the test pieces, and the irregularities of the contact plane of the wafers were detected by means of laser scattering, to thereby count the number of particles 0.3 $\mu$m or larger in size by using a particle counter.

Effect of the Invention

As described above, the glass member resistant to plasma corrosion according to the present invention provides effects as such that it exhibits excellent resistance against plasma corrosion, is free from particle generation, and is suitable for use as a jig material in semiconductor production.

BRIEF DESCRIPTION OF THE DRAWINGS

FIG. 1 is a ternary diagram showing the vitrification range of $SiO_2$—$Al_2O_3$—CaO system and the compositional constitution ratio of Example 1.

FIG. 2 is a ternary diagram showing the vitrification range of $SiO_2$—$Al_2O_3$—MgO system and the compositional constitution ratio of Example 2.

FIG. 3 is a ternary diagram showing the vitrification range of $SiO_2$—BaO—CaO system and the compositional constitution ratio of Example 3.

FIG. 4 is a ternary diagram showing the vitrification range of $SiO_2$—$ZrO_2$—CaO system and the compositional constitution ratio of Example 4.

FIG. 5 is a ternary diagram showing the vitrification range of $SiO_2$—$TiO_2$—BaO system and the compositional constitution ratio of Example 5.

FIG. 6 is a ternary diagram showing the vitrification range of $SiO_2$—$Al_2O_3$—CaO system and the compositional constitution ratio of Comparative Example 2.

The invention claimed is:

1. A member resistant to plasma corrosion, said member comprising a portion configured to be exposed to plasma gas, said portion being of a glass material having a constitution ratio that is within a vitrification range; and wherein the glass material is 60 mol % $SiO_2$, 20 mol % BaO, and 20 mol % CaO.

2. A member resistant to plasma corrosion, said member comprising a portion configured to be exposed to plasma gas, said portion being of a glass material consisting essentially of a compound component expressed by the chemical formula $SiO_2$—BaO—CaO, and having a constitution ratio that is within a vitrification range, and wherein the constitution ratio of the compound component of the glass material is 60 mol % $SiO_2$, 20 mol % BaO, and 20 mol % CaO.

* * * * *